Figure 1:
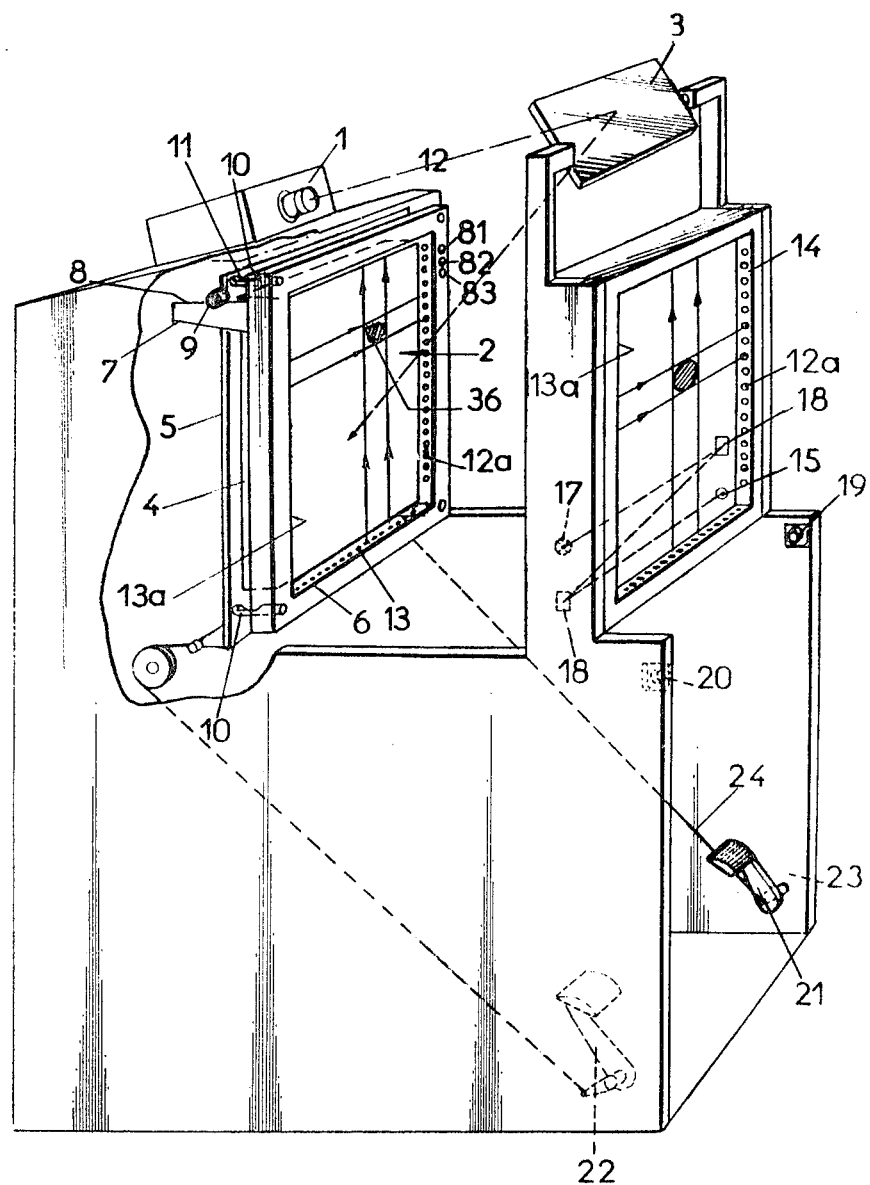

United States Patent

[11] 3,596,376

[72] Inventors: Gaston Avedissian
4, rue Beausejour, Colombes;
Dominique Lamotte, 5, rue du Hameau, Meudon-Bellevue; Lucien Lamotte, 5, rue du Hameau, Meudon-Bellevue; Martine Lamotte, 5, rue du Hameau, Meudon-Bellevue, all of, France
[21] Appl. No. 820,375
[22] Filed Apr. 30, 1969
[45] Patented Aug. 3, 1971
[32] Priority May 2, 1968
[33] France
[31] 150 354

[54] APTITUDE TESTING MACHINE
5 Claims, 5 Drawing Figs.
[52] U.S. Cl. .................................................. 35/22, 272/76, 273/102.2 R
[51] Int. Cl. ................................................ G09b 19/00
[50] Field of Search ........................................ 35/22, 25, 29, 1; 73/379, 380, 381; 272/76; 273/102.2

[56] References Cited
UNITED STATES PATENTS

| | | | |
|---|---|---|---|
| 1,311,383 | 7/1919 | Drasser ......................... | 273/102.2 |
| 2,556,057 | 6/1951 | Becker ......................... | 273/102.2 |
| 3,072,410 | 1/1963 | Simjian ......................... | 273/102.2 X |
| 3,126,646 | 3/1964 | Penraat et al. ................. | 35/9 |
| 3,229,975 | 1/1966 | Tompkins et al. ......... | 273/102.2 (B) UX |

FOREIGN PATENTS

| 330,860 | 12/1920 | Germany ..................... | 35/22 |
|---|---|---|---|

Primary Examiner—Wm. H. Grieb
Attorney—Holcombe, Wetherill & Brisebois

ABSTRACT: Method and apparatus for administering aptitude tests which comprises a motion-picture projector, a screen on which it projects pictures, means for determining the speed at which an object is caused by a test subject to approach the screen in response to a stimulus projected thereon, means for measuring the force exerted on the screen when said object strikes it, and means for correlating such measurements to measure the aptitudes utilized by the subject in responding to said stimulus.

APTITUDE TESTING MACHINE

SUMMARY OF THE INVENTION

The term "aptitude tests" is used to identify tests designed to recognize and measure the natural or acquired aptitudes of a subject in order to predict his behavior under certain circumstances. These tests are most often used to determine the professional, scholastic, or athletic aptitudes of individuals taking these tests.

From a practical point of view psychological tests of this type consist in measuring the behavior of a particular subject when reacting to a great many standardized experimental situations. These diverse experimental situations are set up by a large number of different types of apparatus, each of which is directed in principle, to a particular aptitude and is adapted to measure an arbitrary value specific to that aptitude.

In fact, each test to some extent calls into play all the aptitudes of the subject, and the values obtained are always influenced by all these other aptitudes. Moreover, the need to use a large number of different pieces of apparatus and the difficulties in using them and interpreting their resulting readings lead to very high costs in proportion to the value derived therefrom. For example, the use of complete tests in the selection of workmen particularly adapted to do a specific job makes it possible to increase the efficiency with which the work is carried out, but at the same time increases its cost to an extent which may be greater than the savings resulting from the increase in efficiency.

The object of the present invention, on the other hand, is to obtain more complete results more economically by simultaneously measuring the parameters corresponding to various aptitudes by means of a single apparatus of general utility.

The present invention accordingly comprises as a new article of manufacture apparatus for testing subjects which consists essentially of motion-picture projecting means which projects directly, or by means of a mirror, filmed sequences on a screen which serves as a target and consists of a sheet of foam rubber. The scene shown in the film sequence, which preferably employs sound, places the subject in a situation corresponding to the type of test selected, and the action required of the subject. That is to say, the movement of an extremity or a segment of a member, such as a fist, is initiated by a stimulus consisting of one or more lighted and colored symbolic drawing which appear on the screen, or which disappear, or by an audible signal. The apparatus also comprises detectors and measuring devices actuated by the film and by the end of the member, which make it possible to measure and record several characteristic magnitudes in the course of a single bodily movement.

These devices may consist of a photoelectric cell actuated by more or less dark zones on a track along the edge of the film and serving to mark the instant that an optical stimulus disappears or to actuate an audible stimulus, two barriers formed by beams impinging on photoelectric cells and marking it possible to determine the initial position of the end of the member, when it has interrupted the beams of the first barrier but not the second, a grid of similar photoelectric barriers utilizing parallel rays to determine the instant at which the segment of the member reaches the target and the coordinates of the point of impact on the target, and pressure-responsive gauges mounted on the supports for the sheet carrying the target and adapted to measure the force exerted on the target as a function of time. The apparatus also comprises an electronic device connected to its various elements and adapted to measure various times, to determine the average coordinates of the center of gravity of the impact surface, to determine the maximum force and the energy exerted on the target, and finally to record the various values obtained.

Figure 2:
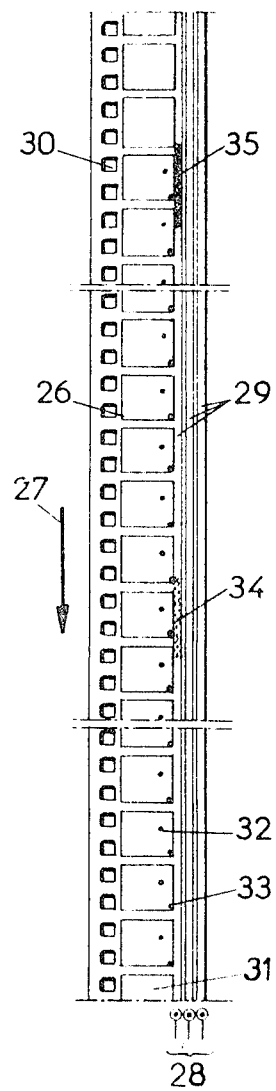
Figure 5:
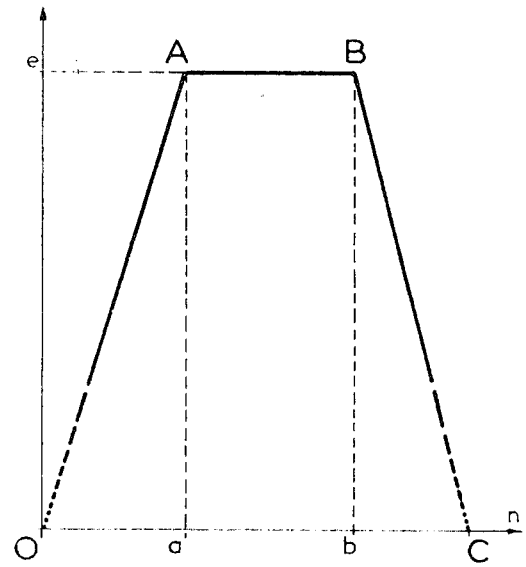
Figure 3:
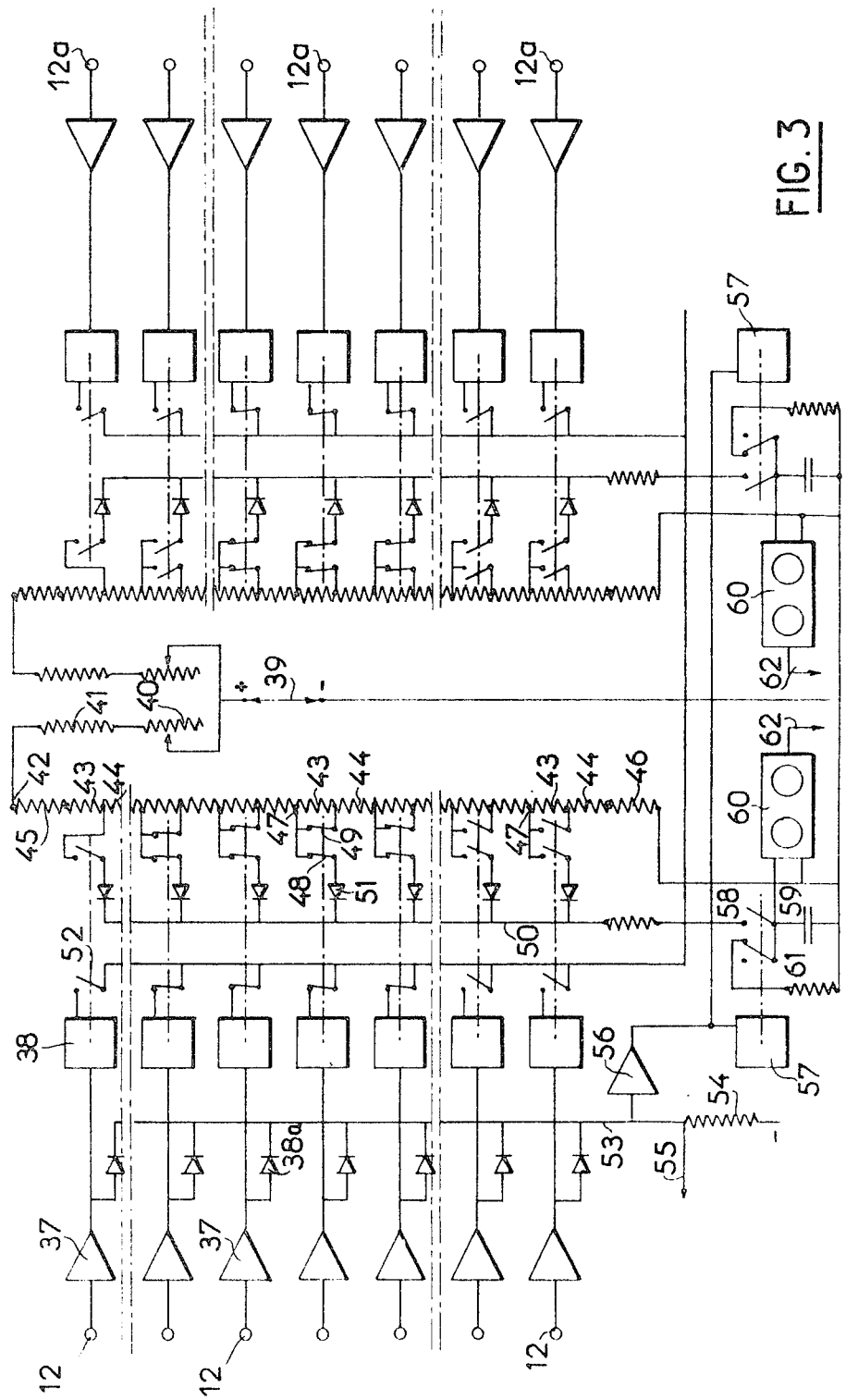
Figure 4:
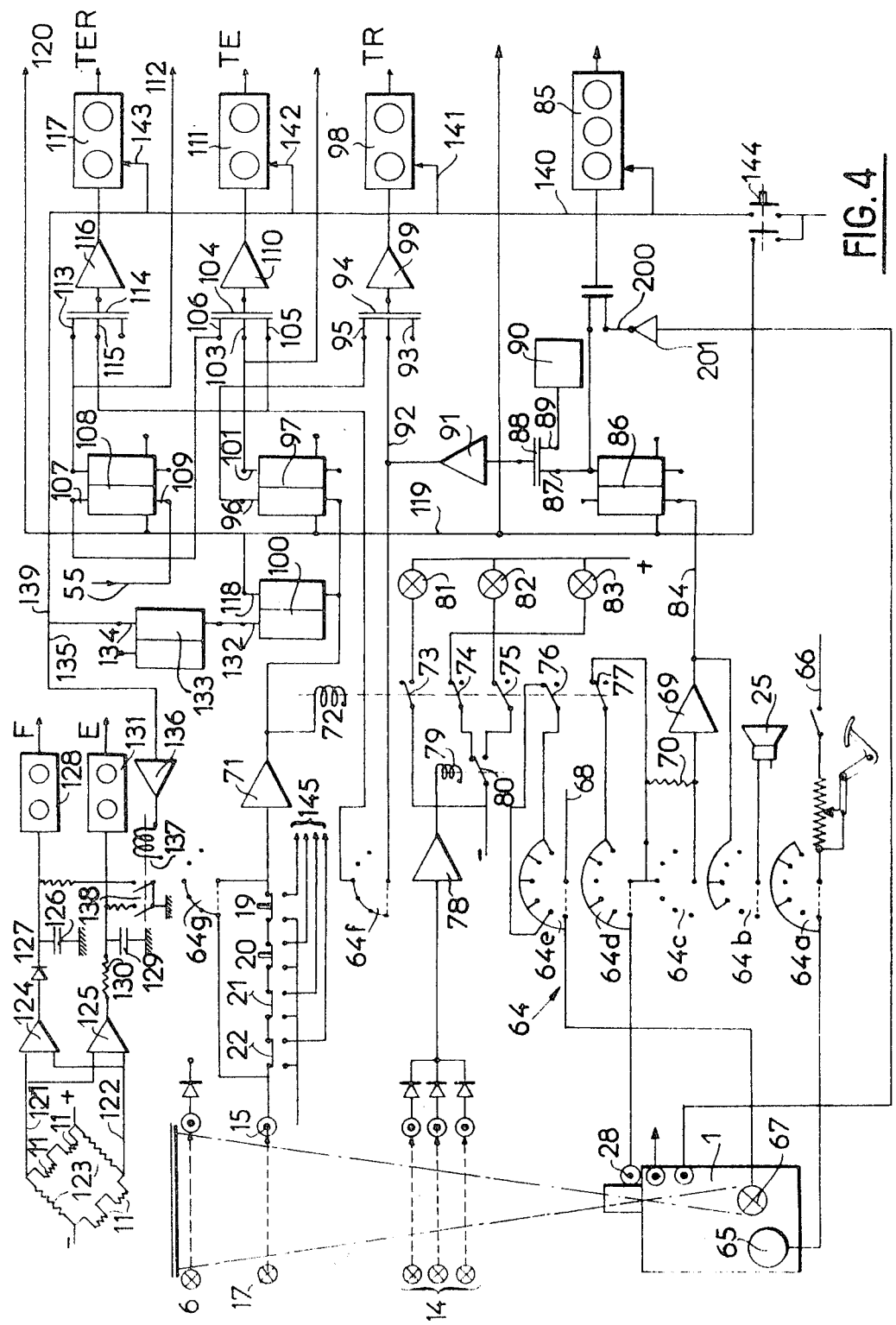

In order that the invention may be better understood, one embodiment thereof will now be described, purely by way of illustration and example, with reference to the accompanying drawings, in which:

FIG. 1 is a perspective view of the apparatus as a whole with the cover partly broken away;
FIG. 2 shows a segment of film;
FIG. 3 shows the circuit diagram of the device for determining the center of the area of impact;
FIG. 4 shows the circuit diagram of the apparatus as a whole; and
FIG. 5 shows in schematic form a curve representing efficiency as a function of the number of tests.

As shown on FIG. 1 the apparatus comprises a motion-picture projector 1 which projects films on a screen 2 after they have been reflected by a mirror 3. This screen is the front surface of a sheet of foam rubber 4 movably mounted in front of a sheet of steel 5. The sheet 4 is encircled by a frame 6 made of metallic channel members fixed to the framework of the machine, which framework is not shown in detail. A bracket 7 is attached at the top of each side of the frame 6. The straight horizontal upper edge 8 of this bracket acts as a rail on which a roller 9 runs. The axis of this roller is fastened to the sheet 5 so as to support the weight of the sheet during its horizontal movement. Each of the four corners of the sheet 5 is connected to the corresponding corner of the frame 6 by a rod 10 on which a pressure-responsive gauge 11 is mounted.

Finally the inner sides of the four corners of the frame 6 are provided with a series of orifices. Photoelectric cells 12 and 12a are mounted in the holes at one side of the frame and electric lamps 13 and 13a are mounted on the other side. These lamps radiate parallel beams through lenses not shown which impinge on the photocells 12 and 12a. These photocells and lamps are regularly spaced, at every second centimeter for example, so as to create two sets of parallel photoelectric barriers which are perpendicular to each other, all the rays passing a short distance in front of the surface of the screen 2.

At the front of the apparatus are three more photoelectric barriers. The first and second are identical to those already described. The third is formed by a photoelectric cell 15 which receives the beam emitted by a light source 17, after reflection by a certain number of mirrors 18 so positioned that the barrier occupies a vertical plane. The apparatus also comprises two manually operable control buttons 19 and 20 mounted on opposite sides of the apparatus and actuating an electric contact, as well as two pedals 21 and 22, also on opposite sides of the apparatus, each pedal being connected by a crank 23 and a control cable 24 to the corresponding lower corner of the metallic sheet 5. The apparatus also comprises an audible warning signal 25, not shown on FIG. 1, but visible on FIG. 3, and a loudspeaker actuated by a magnetophone, but these last two components are not illustrated.

The film used in the projector 1 makes it possible to project on the screen 2 a scene which places the subject in surroundings corresponding to the type of test selected, which may be completed by sound supplied by the magnetophone or the soundtrack of the film. As the film is projected, a stimulus consisting of a bright spot appears at some point within the border of the image and designates the object which the subject must reach, for example with his fist, and at the same time gives the subject an indication as to the gesture required, utilizing a code based respectively on a variable diameter, the color and the intensity of the light.

By way of example, while the position of the first stimulus, as indicated above, designates the target area, the diameter of the spot may indicate the required accuracy and the speed at which this spot increases in size may indicate the required speed of execution of the gesture, while the particular color of the spot indicates the required energy to be expended in the gesture. The colors may, for example, be classified by frequency, with an increase in frequency corresponding to an increase in the quantity of energy required. Finally, the required maximum force of the blow, which is distinct from the notion of energy, as will be hereinafter seen, is indicated by a stimulus located outside or at the edge of the image either by its color, or by the length of time it is visible.

FIG. 2 shows a section of film 26 which travels in the direction of the arrow 27 in front of photoelectric cells 28 which are located at the top of the projector 1 and are so arranged that the beams are intercepted by the track 29 of the film located on the side thereof opposite the perforations 30.

The part of the film shown at the bottom of FIG. 2, which part is projected first, comprises normal images 31 of the scene in question, which are followed by images comprising the central stimulus 32. At the end of several images, corresponding to an unpredictable time of projection, a dark zone 34 appears on the transparent track 29. Finally, in alignment with the last image, corresponding to the disappearance of the stimuli, the track 29 comprises a very dark part 35, that is to say, a zone darker than the zone 34, and the ensuing images are again normal.

At a predetermined instant, which will be hereinafter specified, the subject is instructed to strike the screen 2 with his fist at a point corresponding as exactly as possible to the target designated by the central stimulus. When the fist of the subject reaches the surface of the rubber sheet 4 it intercepts a certain number of the horizontal light rays, depending on the height of the fist, and a certain number of vertical light rays depending on its width. The outline of this fist is schematically represented at 36 on FIG. 1.

The apparatus according to the invention comprises a device adapted to determine the coordinates of the central point of this outline, that is to say, the center of the rectangle defined by the most remote horizontal and vertical light beams which are blocked. A circuit diagram of this device is shown on FIG. 3, which shows at its left the series of cells 12 which receive the horizontal beams of light, and at its right the photoelectric cells 12a which receive the vertical beams of light.

Each photocell 12 (or 12a) is connected to an amplifier 37, which supplies a relay 38 having several contacts.

Normally, when the photocells are energized, they have very little resistance and the corresponding relays 38 outside the zone between the chain lines, are open as shown on FIG. 3. On the other hand, inside the zone between the chain lines, which schematically represents the group of photocells the beams to which are blocked by the fist, the resistance of each cell then becomes great, and the corresponding relays are closed, as shown.

The circuit comprises at 39 a DC power source which delivers a constant voltage of 500 volts for example. The positive terminal of this source supplies through an adjustable resistance 40 and a high-fixed resistance 41, an entire series of resistances connected in series with each other. The adjustable resistance 40 is so controlled that the voltage in the circuit is constant at 10 ma. Let it be supposed, for example, that the target 4 is 50 cm. square and that the point 42 supplied by the resistance 41 is at a potential of 50 volts. For this purpose each photocell 12 is connected to two resistances 43 and 44, 100 ohms each, so that the potential drop is 2 volts or 1 volt per centimeter if the photocells are spaced at every second centimeter. Finally, if the apparatus comprises 21 cells in each direction defining 20 spaces 2 cm. wide, there remain at the edge of the screen zones which are 5 cm. wide which correspond to two 500 ohm resistors 45 and 46 positioned at each end of the series of resistances.

Under these conditions, if the voltage is taken off at a point 47 located above a resistance 43, the value of this voltage directly represents the abscissa of the corresponding cell 12 in centimeters.

However, in order to allow for the fact that the fist intercepts the beams to several photocells 12, and in order to determine the midpoint at which this occurs, each relay 38 comprises a contact 48 designed to take off the voltage of the corresponding point 47 and a contact 49 designed to shunt the resistance 43. All the voltages taken off by the contacts 48 are collected by a common line 50 through diodes 51, which pass only the maximum voltage, that is to say, the voltage taken off by the one of the relays 38 which is closed and which has the maximum abscissa. In this way the line 50 collects a voltage indicative of the abscissa of the cell 12 having the maximum abscissa. At the same time the various closed contacts 49 each reduce by 1 volt the voltage collected, so that this voltage corresponds to the arithmetic average of the abscissae of the various cells 12 which are not illuminated, regardless of the number of these cells.

The relays 38 also comprise a holding contact 52 which keeps the relays closed long enough to carry out the necessary measurement. All that has been said with respect to the determination of the abscissa of the center point is equally applicable to the determination of its ordinate utilizing the right half of the circuit, which is symmetrical with respect to the half which has just been described.

However the series of cells 12 also comprises a common line 53 successively connected to all the amplifiers 37 through the diodes 38a so as to take off the maximum voltage. This line 53 is supplied by a negative source through a high resistance 54, so that when all the cells are normally illuminated, the voltage at 55 is about −5 volts. On the other hand, if one or more cells cease to be illuminated, the voltage of the line 53 abruptly drops to zero.

This makes it possible to determine the instant at which the fist reaches the target. At this instant the line 53 actuates, through an amplifier 56 two relays 57, one of which corresponds to the abscissa and the other to the ordinate, and each of which actuates two contacts, one of which 58, connects the line 50 to a condenser 59, which is itself connected to the terminals of a digital voltmeter 60 which determines the abscissa X of the central point. The other contact 61, when the relay is not energized discharges the condenser 59. A conductor 62 leads from the digital voltmeter 60 to the indicator or register for the abscissa. In like manner, at the right of FIG. 3 are identical components leading to the indicator or register for the ordinate Y.

The circuit shown on FIG. 4 makes it possible to understand how the apparatus works. It will be seen that this circuit comprises a selector switch 64, having seven sections, 64a to 64g, each having six contacts from left to right. Let it be supposed to begin with that the selector switch is in its most leftward position, as shown in broken lines on the drawing. In this position the speed of the motor 65 of the projector 1 is controlled by the accelerometer, and supplied through 64a from the supply 66. The warning signal 25 is not supplied by 64b. The projection lamp 67 is supplied through 64e by the supply 68. Finally, the sections 64c and 64d are connected to an amplifier 69 through a resistance 70 so that this amplifier, the gain of which is reduced by the resistance 70, functions only when the very dark zones 35 of the film 26 are passing in front of a cell 28 and not during the passage of the zones 34 which are not as dark.

In the beginning, the fist of the subject is so placed that it interrupts the light beams corresponding to the frame 14 without interrupting the light beam corresponding to the cell 15. For this reason the cell 15 controls through 64g an amplifier 71 which energizes the coil 72 of a relay having five contacts 73, 74, 75, 76, 77 and when the beam to a single cell in the frame 14 is interrupted this closes the circuit through an amplifier 78, the coil 79 and a reversing relay 80. The coils 72 and 79 are excited when the corresponding cells are illuminated, with the contacts then occupying the position shown in FIG. 4. The apparatus comprises three colored windows, a red one 81, a green one 82, and a yellow one 83, connected as shown on FIG. 4, so that when at rest illumination of the yellow window 83 indicates to the subject that he must advance his fist. He then does this and interrupts the beam to a cell in the frame 14 so that the green window 82 is next lighted, indicating to the subject that his fist is in the proper position. If he advances his fist too far and interrupts the beam to the cell 15, the five contacts of the relay 72 close and the contact 73 lights the red window 81 to indicate to the subject that he must retract his fist.

As the film 26 advances as hereinbefore indicated, the stimulus 32, corresponding to the designation of the target and to various instructions given the subject, will appear near the center of the filmed sequence. When the zone 34 passes in front of a cell 28, as has been seen, it produces no effect. Finally when the stimulus disappears from the screen, the very dark spot passes at the same time in front of a cell 28 and actuates the amplifier 69. This supplies the line 84, which transmits a pulse to the flip-flop 86 which opens the gate 200 and permits the number of sequence to pass through the adapter 201 to record the number N of the new sequence in 85. The order in which the coordinates of the starting point (average values for X and Y) are recorded is also given.

At the same time the flip-flop 86 which supplies the input 87 of a gate ET 88, the other input 89 of which is connected to a time base 90 supplies pulses every hundredth of a second, which it receives through a 50 period circuit and suitable frequency doubler. The gate ET 88 then passes the pulses which are amplified by an amplifier 91 and conducted by the line 92 to the input 93 of another gate ET 94, the other input 95 of which is supplied from the terminal 96 of another bistable relay 97, normally swung to the left at the start. It follows that, when the dark zone 35 passes in front of the cell 28, the decimal counter 98 is supplied by the amplifier 99 at the rate of one pulse each one hundredth of a second.

It is expedient in this case for the stimulus to correspond to the instruction given the subject. At the end of a reaction time TR he reacts and advances his fist in the direction of the target. He then interrupts the beam to the cell 15 which transmits a pulse having a positive leading edge (due to passage from −5 v. to zero) to the amplifier 71 which swings the flip-flop relay 97 without swinging the monostable relay shown at one side thereof in the figure.

When the flip-flop relay 97 swings, this interrupts the supply to the terminal 96 and consequently to the input 95 of the gate ET 94, thus stopping the counter 98 which comes to rest on a decimal number indicating in hundredths of a second the reaction time TR. On the other hand, the terminal 101 is also supplied, and supplies through the connection 102 the instruction to record TR at the same time that it supplies the input 103 of another gate ET 104, a second input 105 of which is already supplied by 91 through 64f, and a third input 106 of which is connected to the terminal 107 of a third bistable relay 108, which swings to be right when its control terminal receives a pulse along the line 55 connected to the corresponding part in FIG. 3. This gate 104 controls a decimal counter 111 through an amplifier 110.

When the first of the subject arrives at the plane of the target and intercepts one of the beams to the cells 12, the voltage of the line 55 passes abruptly from −5 v. to zero, thus swinging the bistable relay 108 to the right, breaking the circuit supplying 106, and stopping the decimal counter 111 which comes to rest while indicating in hundredths of a second tee time of execution TE, that is to say, the time between the beginning and end of the movement. At the same time the swinging of the bistable relay 108 to the right supplies a line 112 which transmits the order to record TE and also supplies the input 113 of a gate ET 114, the second input 115 of which is supplied, like 105, from 64f. This gate ET then begins to pass the pulses which are amplified by an amplifier 116 and supply a decimal counter 117 for recording the time TER required to retract the fist.

After the subject has struck the target, he retracts his fist to its initial position and when the cell 15 is again illuminated, the amplifier 71 transmits an inverted pulse, the negative leading edge of which (passing from zero to −5 v.) swings the monostable relay 100 without affecting the bistable relay 97. This monostable relay 100 then transmits a pulse from its terminal 118 along the vertical line 119 and the horizontal line 120, which latter transmits the instruction to record TER. At the same time the pulse is transmitted through 119 to the three bistable relays 86, 97, 108, thus swinging them to the left into their rest position.

Before arriving at this stage of operations, the fist of the subject, having struck the target, causes the measuring device shown on FIG. 3 and hereinbefore described to operate. This device determines by means of two digital voltmeters 60, the abscissa X and ordinate Y of the central point of impact. At the same time the pressure communicated by the fist to the steelplate 5 through the rubber sheet 4 modifies the resistance of the four pressure-responsive gauges 11 which as shown at the upper left of the circuit of FIG. 4, are mounted as a Wheatstone bridge so as to produce a potential difference between 121 and 122 which is constantly proportional to the instantaneous force applied to the plate. This is obtained by placing the four pressure-responsive gauges 11 in series in one branch of the bridge and regulating the adjustable resistances 123 so as to produce a zero voltage at rest. The potential difference between 121 and 122, which is always in the same direction, since the force on the plate is always positive, is amplified by two amplifiers 124 and 125, the first of which charges a condenser 126 through a diode 127, so that after a continuous change in this voltage the condenser 126 remains charged to the maximum voltage attained, thus representing the maximum force exerted by the fist. This voltage is transformed by a digital voltmeter 128, to give in appropriate units the value of the maximum force. At the same time, the other amplifier charges another capacitance 129 through a load resistance 130 so that the final voltage of the charge of this condenser is proportional to the integral of the instantaneous force as a function of time, which may be called the energy E of the blow. In fact, this is not an energy in the physical sense of the term, that is to say an integral of a force as a function of the corresponding displacement, but is more exactly a pressure. However, from the physiological point of view the notion of work or muscular fatigue is actually a function of the force employed and the time during which it is employed, even in the absence of movement. Finally, it then suffices to measure with a digital voltmeter 131 the charge on the condenser 129 in order to have, in arbitrary units, the value of this muscular energy E.

When the fist, in the course of retraction, again passes in front of the cell 15, as has already been seen, the monostable relay 100 transmits through 120 the instruction to record TER. At the same time it transmits the order to record X and Y received from the two voltmeters 60 and the recording orders F and E through the voltmeters 128 and 131. After having transitted these instructions the monostable relay reverts to its initial condition, that is to say, swung to the left, and it then controls through its terminal 132 another monostable relay 133 which then swings to the right and transmits through its terminal 134 a pulse which actuates through the line 135 and amplifier 136 the coil 137 of a relay 138, the two contacts of which discharge the two condensers 126 and 129 by connecting them to ground. This same pulse is also transmitted over the line 139 and the vertical line 140, and through 141, 142, and 143, the automatic reset to zero instructions for the counters 98, 111, and 117. The monostable relay 133 swings back automatically into its rest position. A manually operated two-pole switch 144 makes it possible to simultaneously supply a pulse to the lines 119 and 140 in order to manually control the resetting of the counters to zero and return of the bistable relays to their rest position, while the apparatus is operating.

It will thus be seen that the machine operates automatically from the time the two stimuli appear on the screen, and measures, while a given movement is being made by the subject, the different factors being tested, that is to say, the reaction time TR, the execution time TE, the retraction time TER, the maximum force F, the muscular energy E, the coordinates X and Y of the impact and start, as well as the sequence number N, all of these values being expressed in decimal FIGS. which may, as has been seen, be recorded by a suitable register using perforated cards, a perforated strip, or a magnetic tape.

The operation so far described takes place when the selector switch is in its extreme left position. If it is now moved to the second position from the left, it is easy to see that, in this case, the motor 65 is no longer supplied and that consequently the image remains stationary at the position selected by the operator after the subject has placed his fist in a ready position, as hereinbefore described. The subject must then at an instant of his choice, drive his fist in the direction of the stationary stimulus appearing on the image. When this interrupts the beam to the cell 15, it is easy to see that the circuit supplying the projection lamp 67 through the contact 76 of the relay 72 and the section 64e of the selector switch is interrupted and the lamp 67 extinguished. It follows that the cell 28 is no longer lighted, and permits the bistable 86 to swing. All the measuring and recording process then takes place as before, except that the bistable relays 86 and 97 swing simultaneously, because they are directly or indirectly controlled by the interruption of the beam to the cell 15. The apparatus thus automatically records all the previously mentioned parameters except the reaction time TR.

If the selector switch 64 is now positioned in the third position from the left everything proceeds as in the first case, except that upon extinction of the stimuli on the screen, the amplifier 69 supplies through the selector switch segment 64b the audible signal 25 thus emphasizing the disappearance of the stimuli by providing an audible signal. The eight parameters previously mentioned are accordingly measured.

When the selector switch is in the fourth position from the left, everything again operates as if it were in the second position, except that the movement made by the subject simultaneously actuates the audible signal 25 through the amplifier 69 and the section 64b of the selector switch. All the parameters previously mentioned except the reaction time TR are measured.

If the selector switch is now moved to the fifth position from the left the film travels normally as it is driven by the motor 65 which is supplied by the section 64a of the selector switch 64 while the lamp 67 is supplied through section 64e of the selector switch. HOwever, in this case, the subject does not strike the target with his fist. He observes the scenes appearing on the screen, which may, in particular, be questions with four standard answers, and he may press one of the buttons 19 and 20 or one of the pedals 22 and 23, depending on the response selected. FIG. 4 shows that the switches associated with the buttons 19—20 and the pedals 21 and 22 are connected in series between the cell 15 and the amplifier and are normally shunted by the section 64g, except in the last two positions, which is precisely the case envisaged. The bistable relay 97 is swung by pressing on one of these devices, thus recording the reaction time, since the counter has been started by the appearance of a very dark zone 35 in front of the cell 28. At the same time the switches associated with the four members 19, 20, 21 and 22 transmit a pulse through another section along four separate lines 145 which causes the response of the subject to be recorded so that its accuracy may be verified.

For certain tests it is only necessary to use the two pedals 21 and 22, but the force and muscular energy applied to the pedals is measured at the same time by the same device as before by means of the connection between those pedals and the plate 5 formed by the cranks 24. The point at which these cranks come in contact with the plate does not matter, since the measuring device always indicates the total force applied to the group of four pressure-responsive gauges regardless of the point at which the force is applied.

Finally the elapsed time TR, the sequence number, the accuracy of the response, and if so desired, the force and energy exerted by the subject are also recorded.

When the selector switch is moved to the sixth position, that is to say, the one at the extreme right, the operation is the same as before except that the scenes which appear successively on the screen may be objects. The subject or subjects may each press a single button such as 19 or 20 when the object pleases them.

Finally the number of the sequence is recorded and the number choices made by the different subjects are recorded through the lines 145.

This apparatus, makes it possible to carry out extremely varied tests by simply changing the film which is projected and utilizing bodily movements ranging from simple reflex actions, up to neuromuscular movements utilizing all the capabilities of the subject, including his sensory organs, his reaction to the stimulus, and the neuromuscular reaction of his cerebral cortex and motor system. It may also be used for intelligence tests. In order to give correct values these may be compared with tests of physical and neuromotor responses in order to evaluate the diverse aptitudes and eliminate secondary influences. These tests may thus be applied at will to the selection and orientation of individuals for both purely manual operations and completely mental occupations and a full range of intermediate types of employment.

In each case, the value of the above eight parameters, or the value of some of them, is determined during each test, while taking care, in the case of the coordinates X and Y of the point of impact, to subtract from the values obtained the known coordinates of the central stimulus so as to determine the difference in abscissa and ordinates in terms of centimeters, between the target point and the point of impact. The various values obtained are compared not to a theoretical maximum as is often done, but to an empirical average determined by statistical comparison of the results of tests on a large number of subjects under the same conditions.

Each test is carried out many times on each subject, in order to study the variation in the values obtained for each parameter, and these values are plotted on a graph as a function of time or of the number of tests. Such a graph, schematically represented on FIG. 5, shows along its abscissa the number of tests and along its ordinate the value of one of the selected parameters (or its converse), and it will be seen that the curve comprises a rising segment OA corresponding to the adaptation to the tests, followed by a practically constant segment AB and a descending part BC corresponding to the fatigue of the subject. By comparing the graph obtained with a graph representing the statistical average obtained with the same type of test, an indication may be derived as to the time Oa required for adaptation, the time of maintained efficiency of endurance ab, the time of increasing fatigue bC, and the average value of the parameter after adaptation Oe. In order to have comparable FIGS. the values corresponding to the test subject are compared with the values of the statistical average graph. For example, the score 20 may be assigned to the values of the statistical average graph. It follows that the subject will have scores above or below 20, depending on whether they are above or below the statistical average score at a given point of comparison, at the same time that he may have adaptation times, endurance times, and fatigue times which are above or below average.

It will be appreciated that these comparisons may be made only for identical tests or tests of the same type, since it is obvious that the attention of the subject will be particularly concentrated on a particular factor in dependence on the type of test, and that this will affect the values obtained for other factors. For example, if the accuracy of the subject is being tested, the subject will force himself to reach the target with accuracy without trying to produce maximum force or energy. Conversely, if the subject is trying to develop maximum force or energy, he will not at the same time secure maximum accuracy, and the same is true for all the other factors being measured. Each time the subject tries to improve one or more of the factors designated by the stimulus code previously described, he can do this only to the detriment of the others. It is consequently necessary to also take these indications into account when interpreting the test results. They may easily be calibrated by the number of the sequence and the position of the selector switch 64.

This results in the universal applicability of the apparatus to all sorts of tests of the ability to select or direct, and also makes it possible to carry out scientific or medical tests designed to systematically determine the characteristics or examine the injuries which a subject may have undergone, at all the levels reached by the tests with respect to the senses, the motor system, the cingulum, the neurovegetative center, and the hypophyses interconnected therewith.

In any case, this result can be obtained only if all the parameters are measured and recorded in the course of a single movement, as only this invention permits, instead of during separate tests as is now usual, since these do not permit accurate correlation.

It will be appreciated that the foregoing embodiment has been given purely by way of example and may be modified as to detail without thereby departing from the basic principles of the invention.

We claim:

1. Apparatus for testing subjects which comprises a screen,
a motion-picture projector mounted to project a motion picture onto said screen,
means for measuring the speed of movement of an object advancing toward said screen, and comprising means for generating light beams positioned to be interrupted by said object as it starts toward and as it reaches said screen,
pressure-responsive means for measuring the force applied to said screen when said screen is struck by said object,
photocells positioned to detect such interruptions,
and means for correlating signals derived from said photocells, said pressure-responsive means, and the track of said film to produce and record signals representative of the physical aptitudes utilized in causing said object to strike said target.

2. Apparatus as claimed in claim 1 further comprising means for producing a signal indicative of the location at which said screen has been struck.

3. Apparatus as claimed in claim 2 in which said means for producing a location-indicating signal comprises:
a first set of light sources positioned to project parallel beams of light in a first direction parallel to and immediately in front of said screen,
a second set of light sources positioned to project parallel beams of light in a second direction transverse to said first direction, parallel to and immediately in front of said screen,
a first set of photocells positioned at regular intervals to receive the light beams from said first set of light sources,
a second set of photocells positioned at regular intervals to receive the light beams from said second set of light sources,
individual resistance means for each set of photocells to which the photocells of that set are connected at regular intervals corresponding to the physical distances therebetween, and
means actuated whenever at least one photocell is darkened by interruption of the beam received thereby to simultaneously short circuit a predetermined portion of that section of the associated resistance means connected between each darkened photocell and the next, and determine the highest resistance remaining between the connection of any darkened photocell and one end of said resistance.

4. Apparatus for testing subjects which comprises:
a screen,
a motion-picture projector mounted to project a motion picture onto said screen,
pressure-responsive means for measuring the force applied to the screen when said screen in struck by an object,
means for generating light beams positioned to be interrupted by said object as it starts toward and as it reaches said screen,
photocells positioned to detect such interruptions,
and means electrically connected to said photocells for measuring and indicating the intervals of time elapsing between successive interruptions of said beams by said object as it approaches said screen.

5. Apparatus as claimed in claim 4 in which said means for measuring the force applied to said screen comprise a frame supporting said screen, a plurality of pressure-responsive means connected to said frame for generating signals proportional to the horizontal pressure received, and integrating means for determining the total energy received by said screen.